US012674476B2

(12) United States Patent
Sendelbach et al.

(10) Patent No.: US 12,674,476 B2
(45) Date of Patent: Jul. 7, 2026

(54) METHOD FOR DETERMINING A PISTON POSITION IN A HYDRAULIC CYLINDER DRIVE, METHOD FOR OPERATING AN ARRANGEMENT INCLUDING A HYDRAULIC CYLINDER DRIVE, AND MECHANISM FOR IMPLEMENTING THE METHODS

(71) Applicant: Robert Bosch GmbH, Stuttgart (DE)

(72) Inventors: Thomas Sendelbach, Lohr (DE); Arnold Engber, Hoesbach (DE); Sebastian Beck, Frammersbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/965,836

(22) Filed: Dec. 2, 2024

(65) Prior Publication Data

US 2025/0188962 A1 Jun. 12, 2025

(30) Foreign Application Priority Data

Dec. 6, 2023 (DE) ..................... 10 2023 212 289.8

(51) Int. Cl.
*F15B 15/28* (2006.01)
*F15B 15/18* (2006.01)
*F15B 19/00* (2006.01)

(52) U.S. Cl.
CPC .......... *F15B 15/2815* (2013.01); *F15B 15/18* (2013.01); *F15B 19/007* (2013.01)

(58) Field of Classification Search
CPC ................ F15B 15/2815; F15B 21/087; F15B 2211/633; F15B 2211/6336
See application file for complete search history.

(56) References Cited

U.S. PATENT DOCUMENTS

| | | | | |
|---|---|---|---|---|
| 5,829,335 A * | 11/1998 | Ewald | F15B 21/087 91/363 R |
| 2020/0309167 A1* | 10/2020 | Klassen | F15B 11/08 |
| 2022/0034336 A1* | 2/2022 | Le Brun | F15B 19/007 |

FOREIGN PATENT DOCUMENTS

| | | | |
|---|---|---|---|
| CN | 108150482 A * | 6/2018 | F15B 15/2815 |
| JP | 2020034056 A * | 3/2020 | G01M 13/00 |

OTHER PUBLICATIONS

Excerpt of Horst-W. Grollius, "Grundlagen der Hydraulik", Mar. 18, 2022, 9th Edition, Carl Hanser (24 Pages).

* cited by examiner

*Primary Examiner* — Thomas E Lazo
(74) *Attorney, Agent, or Firm* — Maginot, Moore & Beck LLP

(57) ABSTRACT

A method for determining a piston position of a piston in a hydraulic cylinder drive includes (i) providing a dynamic model of the cylinder drive, (ii) controlling driving of the cylinder drive with a control signal, (iii) detecting a real piston position of the piston, and (iv) adjusting parameters of the model on the basis of the real piston position. The model maps components of the cylinder drive and outputs a calculated piston position of the piston on the basis of detected operating parameters of the cylinder drive. A method of operating an arrangement having a corresponding hydraulic cylinder drive and a mechanism for implementing the methods are also disclosed herein.

12 Claims, 3 Drawing Sheets

METHOD FOR DETERMINING A PISTON POSITION IN A HYDRAULIC CYLINDER DRIVE, METHOD FOR OPERATING AN ARRANGEMENT INCLUDING A HYDRAULIC CYLINDER DRIVE, AND MECHANISM FOR IMPLEMENTING THE METHODS

This application claims priority under 35 U.S.C. § 119 to patent application no. DE 10 2023 212 289.8, filed on Dec. 6, 2023 in Germany, the disclosure of which is incorporated herein by reference in its entirety.

The present disclosure relates to a method for determining a piston position in a hydraulic cylinder drive, a method for operating an arrangement with a hydraulic cylinder drive and a mechanism for implementing the said methods.

BACKGROUND

Hydraulic cylinder drives ("hydraulic cylinders", "electrohydraulic drives") are described in relevant specialist books, for example H.-W. Grollius, "Grundlagen der Hydraulik", Carl Hanser, 9th edition 2022. Applications for hydraulic cylinder drives include, for example, gas compressors, but also, for example, construction machinery, automation systems, automotive engineering and heavy industry. One advantage of hydraulic cylinder drives is their ability to transfer high forces.

In certain applications, it is advantageous if the piston position in a hydraulic cylinder drive can be detected. However, in practice this sometimes proves to be costly or economically unfeasible.

SUMMARY

A method for determining a piston position in a hydraulic cylinder drive, a method for operating an arrangement comprising a hydraulic cylinder drive, and a mechanism for implementing said methods with the features described below are proposed. Embodiments are also the subject of the following description.

The proposed method for determining a piston position in a hydraulic cylinder drive comprises providing a dynamic model of the cylinder drive, controlling the cylinder drive with a control signal, sensor-based detection of a real piston position of the piston, and adjusting parameters of the model on the basis of the real piston position, wherein the model maps components of the cylinder drive and outputs a calculated piston position of the piston on the basis of detected operating parameters of the cylinder drive. Designs of the proposed method make it possible to determine a continuous virtual actual position value for the piston position, also referred to here as the "virtual piston position". As a result, appropriate designs enable the piston position to be regulated based on the virtual piston position. The process behavior can therefore be regulated much more precisely, robustly and fault-tolerantly.

In certain embodiments, the operating parameters may include a rotational speed and torque of a motor of a hydraulic pump arrangement and one or more cylinder chamber pressures of one or more cylinder chambers of a hydraulic cylinder of the cylinder drive. The corresponding operating parameters are influenced by a piston position and can be detected particularly reliably.

In certain embodiments, the sensor-based detection of the real piston position can be carried out using one or more proximity sensors and/or one or more stop sensors and/or based on chamber pressures and/or a model of the rigidity of the drive at the stop. In particular, the corresponding sensors may already be present in a suitable arrangement. Further elaborate sensor technology can therefore be dispensed with in corresponding designs.

In certain configurations, the parameters of the model can be adjusted once or several times in a working cycle of the hydraulic cylinder drive. Depending on the required accuracy, the frequency of the adjustments can be used to react in appropriate ways.

In certain embodiments, adjusting the parameters of the model can be done based on a learning function that relates the actual piston position and the control signal. Embodiments of the disclosure may in particular draw on any known and proven methods of machine learning or artificial intelligence.

In certain configurations, the control signal can be provided as a jerk-limited or acceleration-limited control signal using setpoint planning. This ensures that operating limits are always observed.

The proposed method for operating an arrangement with a hydraulic cylinder drive includes determining a piston position of a piston in the cylinder drive according to any of the previously and subsequently disclosed embodiments, and controlling the cylinder drive, in particular as part of a regulation, with a control signal defined on the basis of the determined piston position.

The arrangement is in particular a compressor arrangement for compressing or pressurizing a fluid in any state of aggregation, in particular hydrogen, in which the advantages of the disclosure, as explained below, are particularly effective.

For further features and advantages of the proposed method for controlling a hydraulic cylinder drive and different embodiments thereof, please refer to the above explanations regarding the proposed method for determining the cylinder position and its different embodiments, since these apply equally in this case.

The proposed computing unit comprises a processor configured to perform a proposed method, in particular according to any of the embodiments explained above and below. This also benefits from the advantages of the proposed method and its forms, as explained.

The same applies to the proposed computer program, which comprises instructions that, when the computer program is executed by a computer, cause the computer to execute a collision avoidance method, as previously explained in different forms.

The same essentially applies to the proposed computer-readable storage device on which a corresponding computer program is stored.

The implementation of the proposed method or its variants in the form of a computer program or computer program product with program code to carry out all the steps of the method is particularly advantageous because it incurs very low costs, especially if an executive control unit is used for other tasks as well and is therefore already present.

Suitable data carriers for providing the computer program are, in particular, magnetic, optical, and electric storage media, such as hard disks, flash memory, EEPROMs, DVDs, and others. It is also possible to download a program via a suitable computer network (internet, intranet, cloud, etc.).

Aspects and embodiments proposed here are shown schematically in the figures and are described further below with reference to the figures.

DETAILED DESCRIPTION

Figure 1:
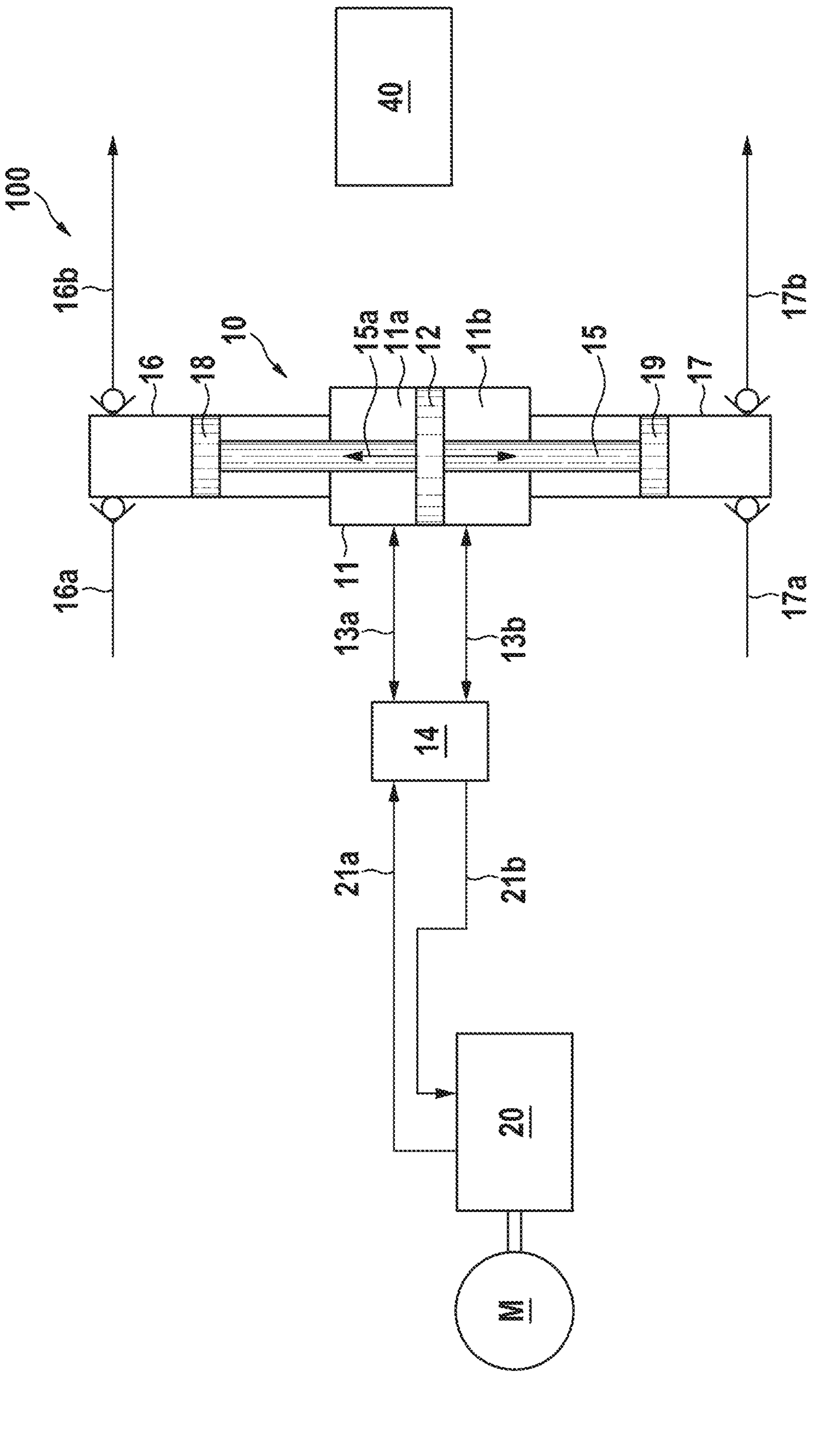
FIG. 1 shows a compressor arrangement according to a proposed design.

The embodiments described below are described only for the purpose of assisting the reader in understanding the claimed features explained previously. They are merely representative examples and should not be considered exhaustive and/or restrictive in terms of the features of the proposed designs.

It is understood that the advantages, embodiments, examples, functions, features, structures and/or other aspects described previously and below are not to be considered as limitations to the scope of the disclosure as defined in the claims, or as limitations of equivalents to the claims, and that other embodiments may be used and modifications made without departing from the scope of the disclosure.

Different embodiments may include, consist of, or essentially consist of further expedient combinations of the described elements, components, features, parts, steps, means, etc., even if such combinations are not specifically described here. Furthermore, the disclosure may include other inventions which are not currently claimed but which may be claimed in the future, in particular if they are encompassed by the scope of the independent claims.

Explanations relating to devices, apparatus, arrangements, systems, etc. according to the embodiments proposed here may also apply to procedures, processes, methods, etc. according to the embodiments proposed here and vice versa. The same, similarly acting, functionally corresponding, structurally identical or comparably constructed elements, as well as method steps, etc., can be indicated in the drawings with identical reference signs.

The exemplary embodiments described above and below include aspects of machine learning. Machine learning is the process of enabling computer systems to perform tasks without specific instructions, wherein algorithms and statistical models are used that rely on the analysis and interpretation of data rather than predetermined decision structures or criteria.

In contrast to rule-based approaches, machine learning is based on the evaluation of training data. To train a machine learning model for its tasks, this training data and supporting information is used as input. In the present case, these are the mentioned operating parameters on the one hand and the detected piston position on the other. The model "learns" by training with a plurality of corresponding training data and the associated information, to derive information from previously unknown data, in this case the mentioned operating parameters, in this case the "virtual piston position". This principle can also be applied to other sensor data by training the model with specific sensor data to learn a transformation between input data and desired output data.

Supervised learning is a common method in which the model is trained with a plurality of training patterns, wherein each pattern comprises specific input and output values. In this process, each training pattern is assigned a specific output value. The model learns to provide the appropriate output value for similar input data. In addition to supervised learning, there is also so-called semi-supervised learning, in which some training examples do not have an assigned output value. Supervised learning can be based on specialized algorithms such as classification, regression, or similarity learning algorithms. Unsupervised learning is another method in which the model is trained without predetermined output values in order to identify structures in the data, e.g. through clustering.

Reinforcement learning is another category in which software agents are trained to perform actions in an environment and to receive rewards based on those actions. The goal is for the agents to learn to choose actions that maximize the total reward.

Additional techniques in machine learning include feature learning, which aims to extract useful features from the data, anomaly detection, which identifies unusual patterns, and the use of decision tree models for predictions. Association rules that identify relationships between data variables can also be utilized in embodiments of the disclosure.

The machine learning models, such as neural networks, support vector machines, Bayesian networks or genetic algorithms, which can be used in the proposed configurations without restriction in untrained, partially trained or pre-trained form, represent the knowledge acquired through the learning process in a data structure or a set of rules. In some cases, the use of a machine learning algorithm implies the use of an underlying model. Training these models adjusts model parameters to achieve the desired outputs for given inputs.

An iterative learning control (ILC) that can be used in the forms proposed here is used to track the control of systems that operate in a repetitive mode. Examples of systems that work in this way include robotic arm manipulators, chemical batch processes and reliability test stands. In each of these tasks, the system must perform the same action repeatedly with a high degree of precision. This action is characterized by the goal of accurately tracking a selected reference signal in a finite time interval.

Through repetition, the system can improve the accuracy of tracking from repetition to repetition. It learns, so to speak, the input required to accurately track the reference. The learning process uses the information from previous repetitions to improve the control signal, so that an appropriate control action can be found iteratively. The principle of the internal model leads to conditions under which perfect tracking can be achieved, but the design of the control algorithm still allows for many decisions that are appropriate for the particular application.

FIG. 1 illustrates a compressor arrangement 100 according to a design proposed herein. As mentioned, the proposed designs are not limited to compressor arrangements or similar devices, but are also suitable for use in connection with other hydraulic devices, in particular in the areas of application mentioned at the beginning.

The compressor arrangement 100 includes a cylinder unit 10 in which a hydraulic cylinder 11 with a hydraulic piston 12 is provided. Hydraulic fluid under pressure is supplied alternately to the cylinder chambers 11*a*, 11*b* arranged on either side of the hydraulic piston 12 in the hydraulic cylinder 11 by way of hydraulic lines 13*a*, 13*b* via a valve arrangement 14, which fluid is in turn provided by way of a hydraulic pump arrangement 20 driven by an electric motor M.

The hydraulic pump arrangement 20 typically includes, in addition to a hydraulic pump, further valves, filters, and control and regulating devices, which are not illustrated separately here merely for reasons of clarity and the general familiarity of which. The cylinder unit 10 with the hydraulic pump arrangement 20 and the motor M is also referred to here as a "hydraulic cylinder drive".

An axle 15 is set in a reciprocating motion, as indicated by an arrow 15*a*, by the alternating supply of hydraulic fluid to the cylinder chambers 11*a*, 11*b*. This also sets in motion compressor pistons 18, 19 arranged in compressor cylinders 16, 17, which have a smaller diameter than the hydraulic piston 12 and therefore cause a hydraulic pressure intensification of a type known per se.

A gas to be compressed, for example hydrogen, is supplied via lines 16*a*, 17*a*, and can flow into the compressor cylinders 16, 17 via non-designated non-return valves that are only designated by the usual symbols. The lines 16*a*, 17*b* can branch off from a common main line, which is not shown separately here. The gas is pressurized by the action of the compressor pistons 18, 19 and, when a counterpressure is exceeded, can flow out through the lines 16*b*, 17*b*, for example into a tank arrangement 40, and be stored there under pressure.

The representation in FIG. 1 should not be understood as restrictive. A plurality of different designs are possible, for example the use of different compressor cylinders 16, 17 that are separate from each other and the hydraulic cylinder 11, the use of more than two compressor cylinders 16, 17, the provision of compressor cylinders 16, 17 in different dimensions and the compression of the gas to different pressure levels.

Although an exact detection of the cylinder position 11 would be desirable, in practice a hydraulic cylinder drive 10, 20, M is often operated in a controlled manner in compressor arrangements 100 of the type shown, but also in other hydraulic arrangements. This means that significant safety distances must be maintained and the maximum speed of the cylinder 11 is significantly reduced.

The reason for this is that, for economic, technological or design reasons, it is not attractive to attach additional position sensors to the corresponding cylinder drives 10, 20, M. This is especially true for drives used to compress gases such as hydrogen. As a result, the degree of delivery (residual stroke minimization) and the flow rate (frequency) cannot be fully utilized in conventional arrangements.

The installation of position transmitters on compressor drives for compressor devices 100, such as hydrogen compressors, is very complex in terms of design and therefore does not always make economic sense. In addition, such drives are often operated without a continuous position sensor, but rather via discrete positions with inductive proximity switches that generate edges at a fixed position. From these switches, certain actuator signals are then generated, for example, so that the cycle is repeated as accurately as possible.

The proposed designs create advantages by providing a virtual position value that enables improved positioning. This allows, for example, the delivery rate and flow rate to be maximized in compressor drives 100. The virtual position value is calculated using a learning method and model-based sensor fusion, as illustrated in the following example.

Figure 2:
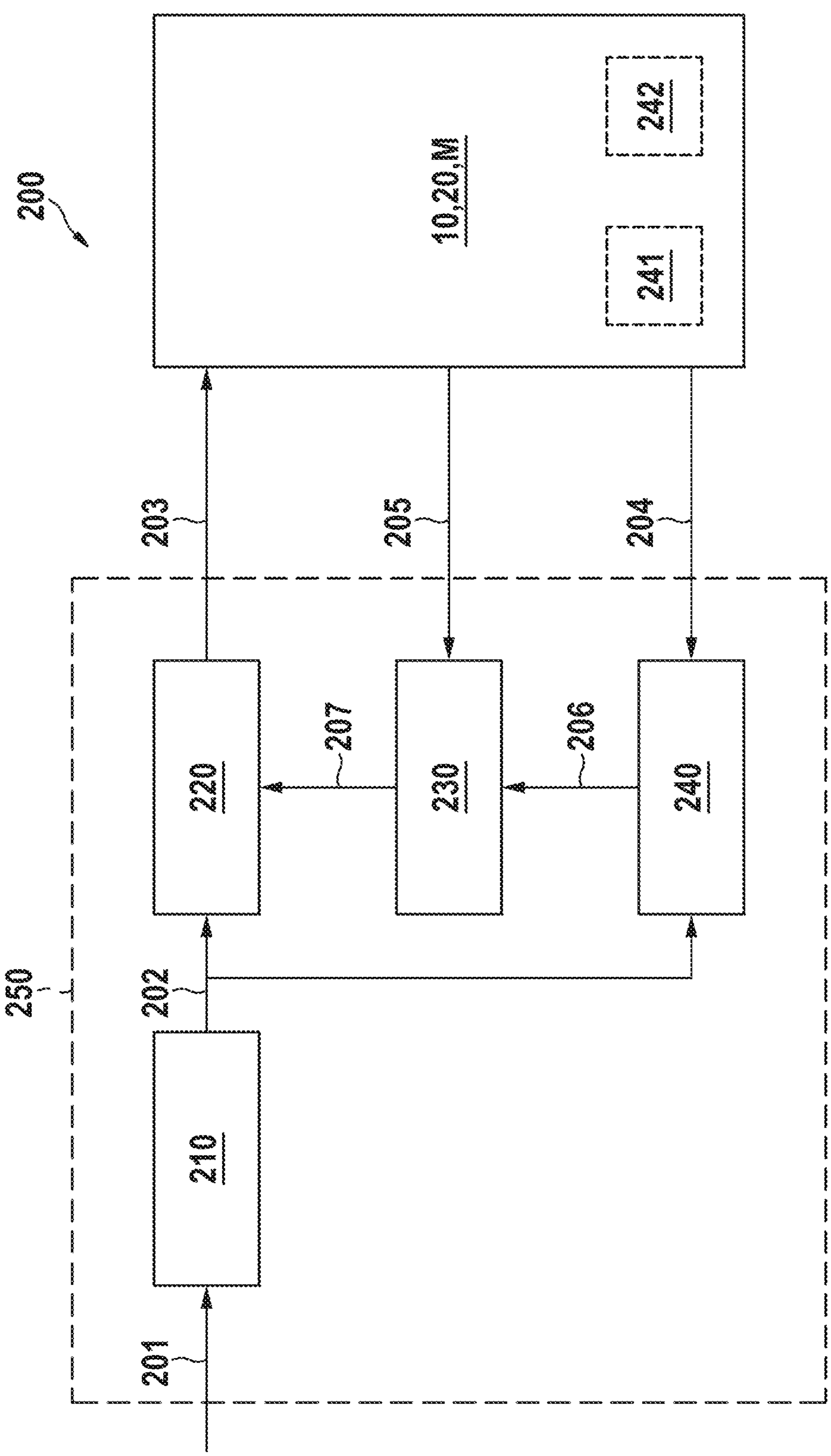
FIG. 2 shows aspects of a proposed design in a functional diagram.

In FIG. 2, function blocks provided in accordance with an embodiment of the disclosure are illustrated in a function diagram 200, wherein a function block illustrating the cylinder unit 10 with the hydraulic pump arrangement 20 and the motor M, i.e. the hydraulic cylinder drive, is designated 10, 20, M.

It is understood that the illustrated functional blocks should not be understood as limiting a particular grouping or realization of certain functions or method steps of a method according to the disclosure or of a corresponding control unit, but merely illustrate the proposed aspects. Certain function blocks can be realized using a control unit 250, which is shown here in a very schematic way.

An input signal 201, for example a position or trajectory request for the cylinder drive 10, 20, M, is supplied to a setpoint planning 210, which processes or limits the input signal 201 in a suitable manner, for example, by limiting the implementation of the position request with regard to jerk and acceleration. In the example shown, a suitably prepared input signal 202 is fed to a control block 220 on the one hand and to a learning block 240 on the other.

Detected position data 204 is supplied to learning block 240, which can be determined, for example, using proximity sensors or stop sensors, as illustrated here in a very simplified way with 241, 242. Typically, these are discrete values, such as those determined at the stop positions of the piston 11 or corresponding stops. If, for example, the detected position data 204 determines that a piston 11, 16, 17 is at a certain detectable position, the learning block 240 can detect this accordingly and thus be "taught" that a certain value of a processed input signal 202 corresponds to a certain real position value.

In this way, the learning block can provide model parameters 206 for a function block 230, which are supplied to a dynamic model 230 in order to adapt it so that it can provide reliable position values even for intermediate positions, for example between the discrete stop positions.

Operating parameters 205 in the form of a rotational speed and a torque of the motor M of the hydraulic pump arrangement 20 and one or more cylinder chamber pressures of one or more cylinder chambers 11*a*, 11*b* of the hydraulic cylinder 11 of the cylinder drive 10, 20, M are supplied to the model 230. The model 230 maps components of the cylinder drive 10, 20, M and outputs a calculated piston position of the piston 11 based on the operating parameters 205 of the cylinder drive 10, 20, M, as illustrated here with a signal 207.

Overall, therefore, as illustrated here, an internal virtual actual position is determined on the basis of the engine rotational speed and the engine torque of the engine M and of cylinder chamber pressures, for example in the cylinder chambers 11*a*, 11*b* according to FIG. 1, and with a dynamic model 230 of the axle system. The virtual position value is adapted with the discrete position information from the learning block 240. The "correction position" can be supplied either with cylinder stops or inductive proximity switches or sensors 241, 242. With the help of the virtual position and the "correction position", a correction of the model parameters can then be calculated for each event (correction signal). This can be done once per cycle (iteratively offline) or immediately online. The upstream setpoint planning generates a maximally realizable trajectory. This increases the stability in the control loop with the virtual position.

The proposed measures can be used to provide a control signal 203 for the cylinder drive 10, 20, M, in particular the electric motor M, in the control block 220, which takes into account the current position of the cylinder 11 and can therefore be provided on the basis of a control which outputs this control signal 203 to the cylinder drive 10, 20, M.

Figure 3:
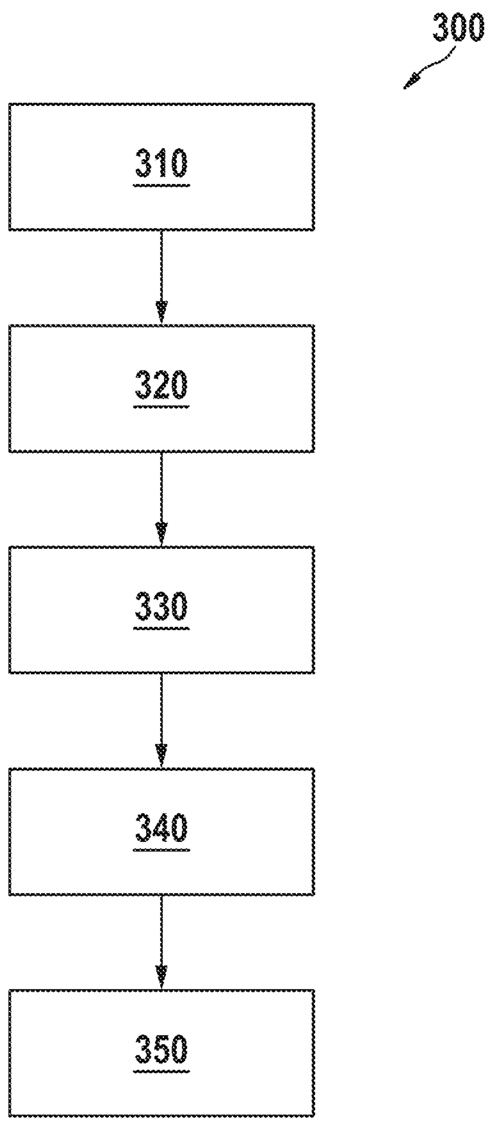
FIG. 3 shows a method according to a proposed design.

FIG. 3 illustrates a method according to a design proposed here and labeled 300 overall.

Method 300 comprises a step 310 in which a dynamic model 230 of the cylinder drive 10, 20, M is provided. Step 310 can be carried out just once when parameterizing or setting up a corresponding cylinder drive 10, 20, M, in particular in the factory or when updating a control unit 250, where an improved model 230 can then also be used.

In a step 320, the cylinder drive 10, 20, M is controlled with a control signal 202, for example to reach a discrete position that can be detected by way of a stop sensor 241 or a proximity sensor 242. When this position is reached, a sensor-based detection 330 of a real piston position of piston 11 can be carried out by way of corresponding sensors.

In a step 340, the parameters of the model 220 are adjusted on the basis of the real piston position, for example using a learning block 240 or a learning function as already mentioned above. In particular, iterative learning observers of a known type can be used.

An Iterative Learning Observer (ILO) is a concept in control and automation engineering that aims to improve the performance of a system over repeated runs or iterations.

An iterative learning observer is used in systems that perform the same task multiple times, as is the case here for the motion of piston 11. During each run, the observer collects data on system performance. During a run, important parameters such as errors, speed, position or other relevant metrics can be detected, as also explained above. This data is then used to analyze and improve the system.

After each run, the observer can analyze the collected data to identify patterns and sources of error. This can be done, for example, by comparing the actual position with a desired position (at the stops). Based on the analysis, the observer adjusts certain system parameters to improve performance in the next iterations.

Ideally, the system converges over several iterations to an optimal or at least improved performance. The goal is for the observer to reduce the error and improve system performance through continuous learning and adjusting.

Since the use of embodiments of the disclosure provides improved position values and, in particular, intermediate values between the discrete, sensor-detected positions of piston 11, an improved operation of the cylinder drive 10, 20, M can be carried out in a step 350, for example on the basis of a control.

Designs of the disclosure thus make it possible to control a hydraulic cylinder without sensors for continuous actual position detection. During operation, the method learns the changes in the axis and load behavior and takes this into account when calculating the virtual position actual value. The virtual position can also be used to better control the process. Using a multistage gas compressor as an example, it is possible to determine which gas pressure stage is currently in operation in order to expel the optimum amount of gas.

What is claimed is:

1. A method for determining a piston position of a piston in a hydraulic cylinder drive, comprising:
- providing a dynamic model of the hydraulic cylinder drive;
- controlling the hydraulic cylinder drive with a control signal;
- performing sensor-based detection of a real piston position of the piston; and
- adjusting parameters of the dynamic model based on the real piston position,
- wherein the dynamic model outputs a calculated piston position of the piston based on detected operating parameters of the hydraulic cylinder drive, and
- wherein the detected operating parameters comprise a rotational speed and a torque of a motor of a hydraulic pump arrangement.

2. The method according to claim 1, wherein the operating parameters further comprise one or more cylinder chamber pressures of one or more cylinder chambers of a hydraulic cylinder of the cylinder drive.

3. The method according to claim 1, wherein the sensor-based detection of the real piston position is carried out using one or more proximity sensors and/or one or more stop sensors and/or based on chamber pressures and/or a model of a rigidity of a drive in the one or more stop sensors.

4. The method according to claim 1, wherein the adjusting of the parameters of the dynamic model is carried out once or several times in a duty cycle of the hydraulic cylinder drive.

5. The method according to claim 1, wherein the adjusting of the parameters of the dynamic model is performed based on a learning function that relates the real piston position and the control signal.

6. The method according to claim 1, wherein the control signal is provided using a setpoint planning as a jerk-limited or acceleration-limited control signal.

7. A method of operating an arrangement having the hydraulic cylinder drive, comprising:
- determining the real piston position of the piston in the hydraulic cylinder drive with the method according to claim 1; and
- controlling the hydraulic cylinder drive with the control signal determined based on the real piston position.

8. The method according to claim 7, wherein the arrangement is a compressor arrangement for compressing a gaseous fluid.

9. A hydraulic cylinder drive or arrangement having a hydraulic cylinder drive, either of which comprises a computing unit configured to carry out the method according to claim 1.

10. A computing unit comprising a processor configured to carry out the method according to claim 1.

11. A computer program comprising instructions which, when executed by a computer, cause the computer to carry out the method according to claim 1.

12. A non-transitory computer-readable data carrier, on which the computer program according to claim 11 is stored.

* * * * *